Sept. 9, 1958
L. FARNSWORTH
2,850,790
TURRET LATHE
Filed Sept. 19, 1956
5 Sheets-Sheet 1
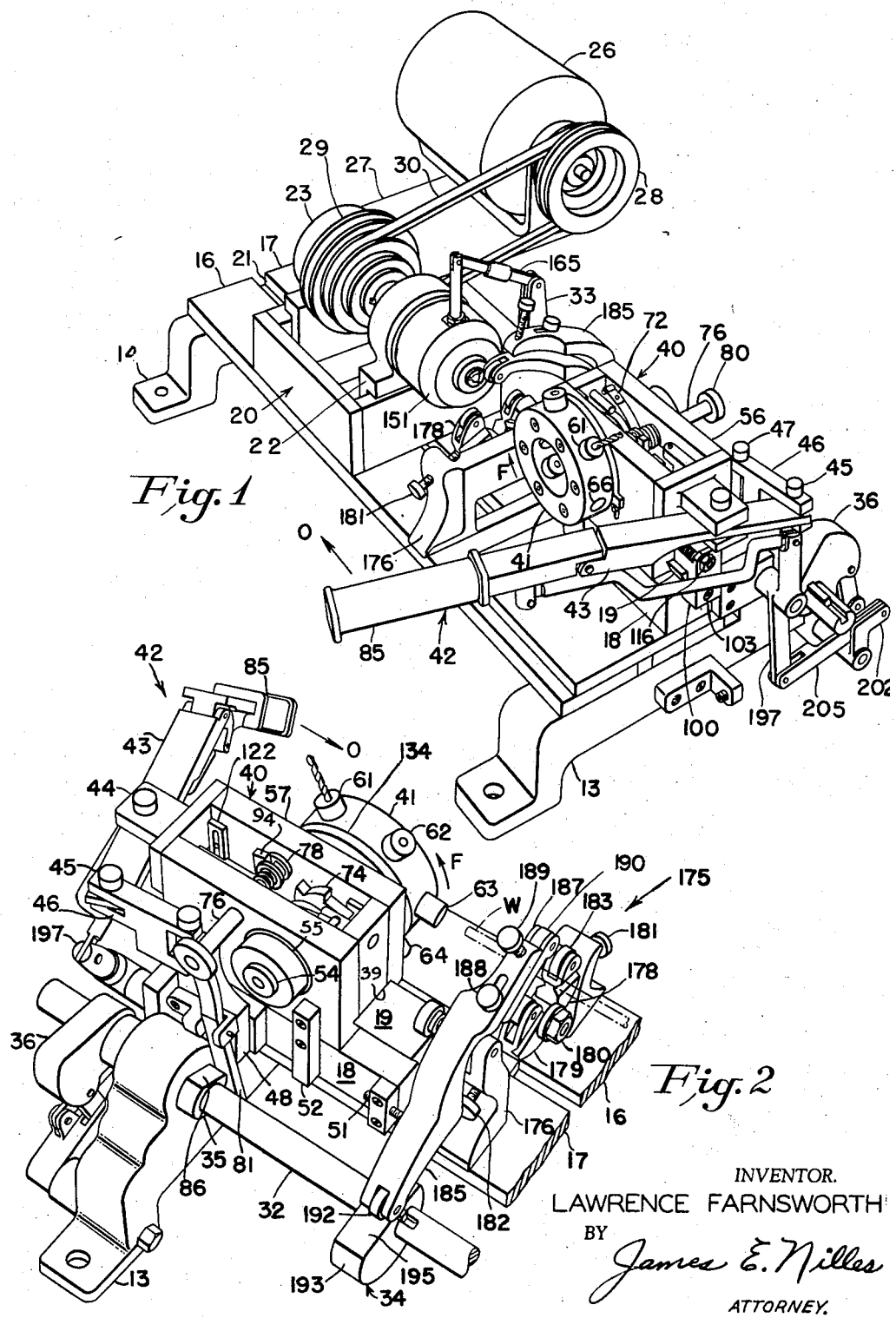
INVENTOR.
LAWRENCE FARNSWORTH
BY
James E. Nilles
ATTORNEY.

Sept. 9, 1958     L. FARNSWORTH     2,850,790
TURRET LATHE

Filed Sept. 19, 1956     5 Sheets-Sheet 2

INVENTOR.
LAWRENCE FARNSWORTH
BY James E. Nilles
ATTORNEY.

Sept. 9, 1958 L. FARNSWORTH 2,850,790
TURRET LATHE
Filed Sept. 19, 1956 5 Sheets-Sheet 3
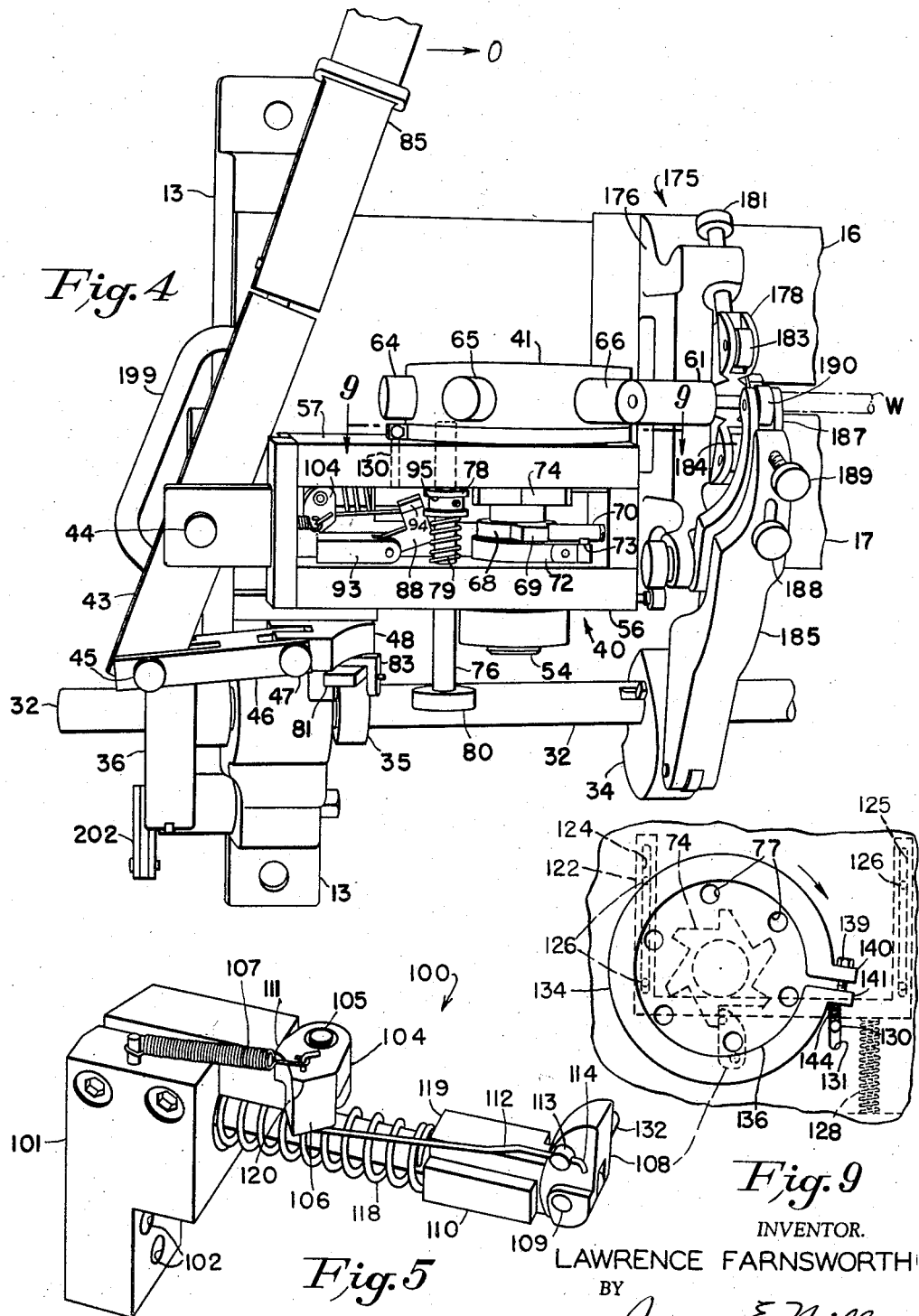
INVENTOR.
LAWRENCE FARNSWORTH
BY James E. Nilles
ATTORNEY.

Sept. 9, 1958   L. FARNSWORTH   2,850,790
TURRET LATHE
Filed Sept. 19, 1956   5 Sheets-Sheet 5

INVENTOR.
LAWRENCE FARNSWORTH
BY
James E. Nilles
ATTORNEY

United States Patent Office 2,850,790
Patented Sept. 9, 1958

2,850,790
TURRET LATHE

Lawrence Farnsworth, Racine, Wis., assignor of fifty percent to Max M. Seft, Racine, Wis.

Application September 19, 1956, Serial No. 610,741

7 Claims. (Cl. 29—45)

This invention relates in general to metal working machines and finds particular utility in turret lathes for centering and drilling the ends of small workpieces.

One object of the invention is to provide a turret mechanism which unlocks the turret, indexes it for the next tool to be used, and locks it in this next position by a simple movement of the turret away from the work. The invention further contemplates that at the end of the desired predetermined number of operations the turret will automatically be returned to its initial position without the necessity of the turret completing the remainder of its cycle.

Another more specific object of the invention is to provide a mechanism of the above type, including a cut-out device which renders the indexing mechanism inoperative so that at the end of any given number of operations the turret will no longer index and one of the tools will remain, if desired, in operative position for subsequent use.

Another object of the invention is to provide a single compound control handle for a machine of the above type which during its initial movement functions to lock the workpiece in a driving chuck, actuate a centering rest and lock it in position and then causes a locking mechanism to lock the turret. In the second movement of the handle the tool is moved into engagement with the workpiece. After the operation is performed by the tool, the return movement of the handle causes the turret to be released, indexed to a new position and locked therein for the cut by the next tool. At this point however, if the desired number of operations has been performed on the workpiece, the handle is simply released which causes the turret to be unlocked and returned to its initial position and also causes the workpiece to be unlocked from the centering rest and chuck.

A general object of the invention is to provide an improved turret lathe.

Other objects and advantages of this invention will become more apparent from the following detailed description and attached sheets of drawings wherein a form of the invention is illustrated. Accordingly, the present invention may be considered as comprising the various constructions, combinations, or subcombinations of parts as is hereinafter more fully set forth in the detailed description and in the claims, reference being had to the accompanying drawings in which:

Figure 1 is a perspective view of a machine embodying the invention, the view being taken generally from the front, right, upper side, and shows the control handle in the operative position.

Figure 2 is a perspective view of the machine shown in Figure 1, but with certain parts broken away, the view being taken generally from the rear, upper side, and showing the machine in the inoperative position.

Figure 4 is a perspective view of the machine shown in Figure 2 but on an enlarged scale, taken generally from the top of the machine and showing it in the operative position.

Figure 5 is a perspective view of part of the turret actuating mechanism partially shown in Figure 4 but on an enlarged scale, the view being taken generally from the rear, upper, left side of the mechanism.

Figure 9 is a fragmentary, front, elevational view taken generally in the direction of line 9—9 of Figure 4, but not showing the turret in cross section for the sake of clarity, and showing the cut-out device.

Support structure

Figure 3:
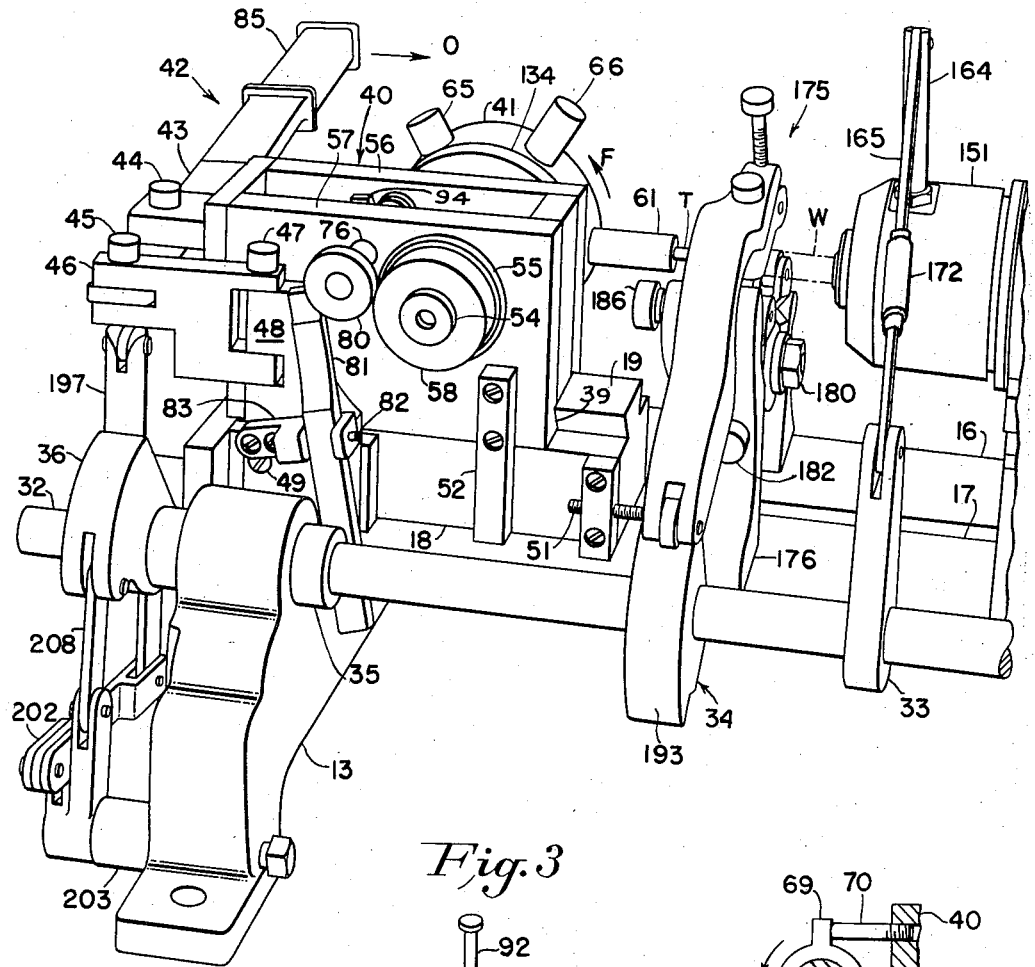
Figure 3 is a perspective view of the machine shown in Figure 1, but on an enlarged scale, certain parts being broken away. The view is taken generally from the rear and shows the machine in the operative position.

Referring in greater detail to the drawings, and particularly Figure 1, the machine has a stationary support structure including a pair of similar transverse legs 13, 14 rigidly connected together by two horizontal plates 16, 17. A guide block 18 (shown best in Figs. 2 and 3) is rigidly fixed to plates 16, 17 adjacent the right end thereof. The block has a V-shaped way portion 19 (best shown in Fig. 3) extending along its top side and terminating at the right end of block 18 as shown in Fig. 1. A drive supporting box 20 is adjustably secured to plates 16, 17 for being secured along their length, generally on the left half of said plates, in a plurality of positions. Although the means for securing box 20 to plate 16, 17 is not shown, the connection is conventional and well known to those skilled in the art. It is believed sufficient to say that the box has a projection at its underside which slides in the space 21 between plate 16, 17. Bolt means extend downwardly from the box, and through the space 21 and are threadably engaged in nut means at the underside of the plates. Bearing blocks 22, 23 are rigidly secured to box 20. Thus a rigid support structure for the lathe is provided.

Drive means

The tubular drive shaft 24 is rotatably supported on the support structure in suitable anti-friction bearings 25 (Figure 8), only one shown, which are mounted in bearing blocks 22, 23 in the conventional manner. Means for driving shaft 24 are provided in the form of an electric motor 26 secured to box 20 by plate 27 in any suitable manner. Step cones 28, 29 of the motor and shaft 24, respectively, are connected through flexible belt 30 for variable speed ratios.

Actuating member

A main actuating member for the various parts of the machine is provided in the form of shaft 32 which is mounted for oscillation in legs 13, 14 as shown for leg 13 in Figure 3. Rigidly secured to this shaft for oscillation therewith are the chuck operating arm 33, centering rest cam 34, turret release cam 35, and the operating linkage arm 36, all of whose functions will appear more fully hereinafter.

Turret housing and assembly

A rectangular, box-like turret housing 40 is provided for rotatably mounting the turret 41 and for housing the mechanism for the turret. The housing 40 is adapted to be secured on the V-shaped way 19 for sliding engagement therealong and acts to carry the turret toward and away from the workpiece. Along the bottom side of the housing 40 is a V-shaped passageway 39 which is complementary to and adapted to slidably receive the guide block 19. The compound handle 42 moves the turret and is pivoted intermediate the length of its feed portion 43 to the housing by pin 44. The rear end of handle portion 43 is pivoted by pin 45 to arm 46 which in turn is pivoted by pin 47 to block 48. Block 48 is rigidly secured to the guide block 18 as by screws 49 (only one shown in Figure 3). When the handle 42 is swung to the left, as viewed when facing the front of the machine, in other words, in the direction indicated by the arrow 0, the turret housing is slid along the way 19 to the operative position where the tool carried by the turret would engage the end of the workpiece W which is indicated in broken lines. An adjustable depth stop 51 (Figs. 2 and 3) is secured to block 18 against which is adapted to bear the stop member 52 carried by the turret housing to limit the travel thereof. Thus the tool which is carried by the turret can move only to the limit determined by the adjustable threaded stop 51 so as to provide an accurate depth to which the tool will cut.

The turret 41 is rigidly secured to shaft 54 which is suitably journaled in conventional anti-friction roller bearings 55 (only one shown) in the front and rear walls 56, 57 of housing 40, and held therein by the large nut 58 on the rear end of shaft 54.

Figure 10:
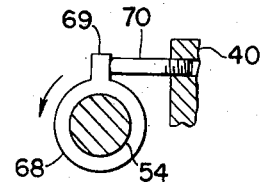
Figure 10 is a fragmentary, rear, elevational view of the index stop shown best in Figure 4.

The turret shown for purposes of this disclosure has six tool holders 61–66, in only 61 of which has a tool T, a drill, been indicated. In the normal sequence of operation the turret is rotated as will appear more fully, in the direction indicated by the curvilinear arrow F, that is, in a clockwise direction when facing the front of the machine (Figure 1), as each tool is successively used in performing the various operations such as drilling, counterboring, reaming, chamfering, etc., on the end of the workpiece. An index stop 68 (shown best in Figure 10) is rigidly secured to shaft 54 within housing 40 and has a portion 69 which is adapted to bear against a pin 70 threaded into housing 40 (Figure 4). Pin 70 may be considered as forming an integral part of the housing. In the position shown in Figure 10, where the stop portion 69 of the turret assembly abuts against pin 70, the tool 61 is in the operative position shown in Figures 3 and 4. In other words, this would be the first tool used in the sequence of operations and will be referred to as the initial or first position. As the sequence of operation progresses, the stop 68 rotates with the turret in the direction indicated by the curvilinear arrow. As shown best in Figures 1 and 4, a resilient means is provided for urging the turret back to the initial position. This means includes a flat coiled spring 72 which is wound around the shaft 54 and has its inner end secured thereto while its outer end is secured to post 73 threadably engaged rear wall 57 of the housing. The spring urges the shaft 54 and turret 41 in the counterclockwise direction, as viewed from the front, i. e., in the direction opposite to that indicated by the curvilinear arrow F. When the turret is unlocked, as will presently be described, the spring rotates the turret back to the initial position where the projection 69 of the stop member abuts against the housing portion 70.

An indexing member is provided for the turret in the form of a toothed wheel 74 which is also rigidly secured to shaft 54 for rotation therewith and has six teeth, one for positioning each of the corresponding six tool holders. Thus a turret assembly comprises the turret 41, shaft 54, stop member 68, and index member 74 and is rotatably mounted on the housing 40 for slidable movement therewith along the guideway 19.

Figure 6:
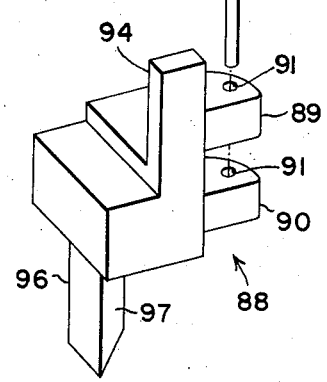
Figure 6 is a perspective view of another part of the turret actuating mechanism partially shown in Figure 4, but on an enlarged scale. The view is taken generally from the front, left, upper side of the mechanism.

Means are provided for releasably locking the turret assembly to the housing in either of the six tool cutting positions. This means is shown as including a rod 76 (best shown in Figure 4) extending through the walls 56, 57 of the housing and adapted to extend into any of the six apertures 77 (Figure 9) of the turret 41. When rod 76 is in any of apertures 77 the turret is locked against rotation in that corresponding tool cutting position. A grooved collar 78 is rigidly secured to shaft 76, by a set screw for example, and a spring 79 is located around shaft 76 and acts between collar 78 and wall 56 to urge the rod 76 into an aperture 77 of the turret to thereby lock the latter against rotation. The outer end of rod 76 which extends from the rear of the housing has rigidly secured thereto a cap 80. The inner side of cap 80 is adapted to be contacted (see Fig. 3) by the upper end of the vertical lever 81 which is pivoted intermediate its length on pin 82 which extends through the bifurcated bracket 83. Bracket 83 is rigidly secured, as by bolts or any suitable manner, to the block 48. Bracket 83 and block 48 may of course be formed as an integral part of the housing and are considered a part thereof. The lower end of lever 81 rides against the cam 35. When the releasing portion 85 of the control handle is dropped about its pivot 85a (Figure 7) at the end of a complete series of operations on a workpiece, the linkage assumes the full line position shown in Figure 7. When in this position, the diametrical or larger portion of the cam 35 bears against the lower end of lever 81 and causes it to swing towards the housing. At the same time the upper end of the lever holds rod 76 rearwardly and out of contact with the turret. Thus at the end of a complete series of operations on the workpiece the operator withdraws the last tool from the workpiece by swinging the entire handle to the right (opposite to arrow 0) and drops the portion 85 of the handle. This dropping movement of the shaft actuating handle portion 85 thus causes the turret to be unlocked and the spring 72 then returns the turret from whatever position it last occupied back to the initial position where stop member 68 bears against pin 70. At this point the finished workpiece would be unloaded from the machine and a new piece of stock positioned in the chuck to be described later. Then when the handle portion 85 is again raised, the linkage of Figure 7 assumes the broken line position and the flat surface 86 of cam 35 is then presented to the lower end of lever 81. This permits the spring 79 to move the rod 76 into locking engagement with the turret. Thereafter, when the various tools are used, the rod 76 is moved to unlock the turret as required by the index trip member 88, shown clearly in Figure 6, and which will now be described.

The index trip member 88 has a pair of arms 89, 90 having aligned apertures 91 by which it is pivotally mounted within the housing on a vertical axis formed by pin 92 carried by mounting block 93 (Figure 4). The block 93 is rigidly secured to the wall 56 in any suitable manner, and simply acts as a pivotal mounting for trip member 88. Member 88 has an upper post part 94 which is adapted to be engaged in the groove 95 of collar 78. Swinging movement of the trip member 88 in one direction (clockwise as view in Figure 4) causes the post to enter groove 95 and move rod 76 rearwardly to unlock the turret. The trip 88 also has a lower post 96 having a cam surface 97 which is adapted to be struck by the following index mechanism when the housing is moved away from the workpiece.

As shown best in Figure 5, indexing mechanism 100 is provided for swinging trip 88 to unlock the turret and for then rotating the turret to the next tool position. The index mechanism 100 is rigidly secured to the guide block 18 (Fig. 1) and extends into the housing through the right end thereof. As the housing is guidingly slid on the guide block it also slides over and relative to the index mechanism 100. The mechanism 100 includes a block 101 having a pair of apertures 102 through which extend bolts 103 (Fig. 1) and which in turn are threadably engaged in guide block 18 for rigidly securing the mechanism 100 to the main support frame. A catch 104 is pivoted to block 101 on pin 105 and has a cam surface 106. A spring 107 yieldingly holds the catch in the position shown in Fig. 5 where it abuts against the block as at 111. As the housing is moved from the position shown in Fig. 4 and away from the workpiece the trip member 88 is of course carried with it. As the cam surface 97 of trip 88 hits the cam surface 106 of the stationary catch 104, post 94 is rotated clockwise (Fig. 4) to engage the grooved collar 78 and withdraw rod 76 from the turret. As the trip 88 passes and clears catch 104 it is rotated counterclockwise (thus returned to its starting position) by the action of spring 79 which snaps rod 76 back into engagement with the next aperture 77 of the turret. As the housing is being moved away from the workpiece, as above mentioned, the dog 108 engages the lowest tooth of wheel 74 (Fig. 9) and causes spring 118 to be compressed. Then immediately upon rod 76 being removed from contact with the turret by trip 88 and catch 104, the dog 108 rotates the turret to the next position with a snap action. Before the turret reaches the next position, however, rod 76 is bearing against it and snaps into the next aperture 77 which is aligned with the rod. The dog 108 is pivoted on a horizontal axis formed by pin 109 in the rod-like member 110. In the position shown in Figure 5 it abuts against member 110 and cannot move any further in a counterclockwise direction. It can however, rotate in a clockwise direction and when it does so it carries with it the catch 104 to which it is connected by a one-way sliding connection as follows. A projection 113 extends from the dog and through which slides the link 112 which is held captive therein by the bent end portion 114 of the link. The other end of the link is turned upwardly and extends through catch 104 to protrude at its top side for engagement with spring 107. The member 110 is slidably mounted in block 101 and protrudes through at its outer end (Fig. 1) where a large nut 116 is threadably engaged thereon to hold it in assembled relationship with block 18. The spring 107 returns the catch and dog to their initial or "cocked" positions. This one-way connection is also used to cut-out the catch 104 entirely as will appear. A compression coil spring 118 acts against block 101 and a shoulder 119 of member 110 to urge the latter to the right, as shown in Fig. 5, that is to say, into the tooth wheel engaging position. Thus as the housing is moved away from the workpiece the member 110 is "cocked," that is, the spring compressed so as to forcibly snap the turret into the next position immediately upon its being unlocked by trip 88. When the housing is then moved toward the workpiece for the next tool operation, the surface 120 of catch 104 is hit by the moving lower post 96 and simply swings aside to permit return of the housing to the operative position. Likewise, the dog 108 simply swings downwardly to permit the tooth wheel to pass by.

Cut-out means

Sometimes only a few of the tools are required to finish a workpiece. These small cylindrical workpieces are loaded into the machine by the left hand of the operator while his right hand is used to operate the handle 85. The operation is such, as will more fully appear later, that the operator simply swings the handle in a horizontal plane toward and away from the work to bring the tool into engagement with the work and then remove it. The latter movement causes the next tool to be indexed as above described. When the desired number of operations is completed on the workpiece, the handle is dropped which returns the turret to the initial position.

However, it may be desirable to use only the first tool on a workpiece, that is, only one operation is to be performed on the piece, or it may be desirable to use a few of the tools and then leave the last one used in the cutting position for another stroke or more. To permit this flexibility of the machine, cut-out means have been provided for predetermining when (during the indexing sequence) the index mechanism 100 will be rendered inoperative. As best shown in Figures 9 and 2, a generally U-shaped plate 122 is shiftably mounted on the inner side of wall 57 for up and down movement. The upwardly extending legs of plate 122 have slots 124, 125 therein through which pass the cap bolts 126 which are threadably secured to wall 57 and slidingly hold plate 122 thereto. A spring 128 bears against the plate 122 and is fixed to the housing at its lower end to urge the plate upwardly. A pin 130 is secured on plate 122 and extends forwardly through a slotted opening 131 in the front wall 57 and a slight distance beyond this wall. The dog 108 has a pin 132 extending from its front side on which is adapted to ride the lower edge of plate 122. An adjustable stop is secured to the turret for rotation therewith which is adapted to shift the plate 122 into releasing position of the mechanism 100, as follows. A split ring 134 is mounted on a peripheral portion 136 of reduced diameter of the turret and adjustably secured thereto by the set screw 139 which extends freely through the ear 140 and is threaded into ear 141. Thus the ring can be tightly secured to the turret for rotation therewith in any number of positions relative to the turret. Both ears 140 and 141 are formed integrally as a part of the ring. The ring has a yieldable stop in the form of ear 141 which has a spring 144 secured to its lower side and extending downwardly therefrom and is adapted to contact pin 130 as follows.

Suppose, for example, it is desired to use only the first three tools on the turret and then leave the third tool in position for other operations rather than having the turret index to the fourth tool. The ring would then be set for cut-off at the third tool in the following manner. The third tool is manually positioned in cutting or operative position in alignment with the workpiece. Set screw 139 is loosened and the ring turned clockwise (Fig. 9) until the spring 144 of ear 141 pushes pin 130 to the lower extremity of slot 131 and the screw is then tightened, thus securing the ring to the turret. When the pin 130, and consequently plate 122 attached thereto, are pushed downwardly, the dog 108 is also pushed downwardly where it cannot contact the toothed wheel. When dog 108 is rotated downwardly it swings catch 104, through link 112, to a position where it cannot be contacted by the trip 88. Therefore, when the turret has been cycled through the desired number of tools (three in this case), the yieldable spring 144 causes plate 122 to render the mechanism 100 inoperative by forcing dog 108 downwardly after it has cleared the toothed wheel. The third tool can then be swung between tool engaging and inoperative positions, as long as the handle portion 85 is not dropped. When the handle is released, portion 85 drops thus removing rod 76, through lever 81, from contact with the turret. Spring 72 then returns the turret to the initial position where stop member 68 (Fig. 10) bears against pin 70.

Workpiece holding means

Figure 7:
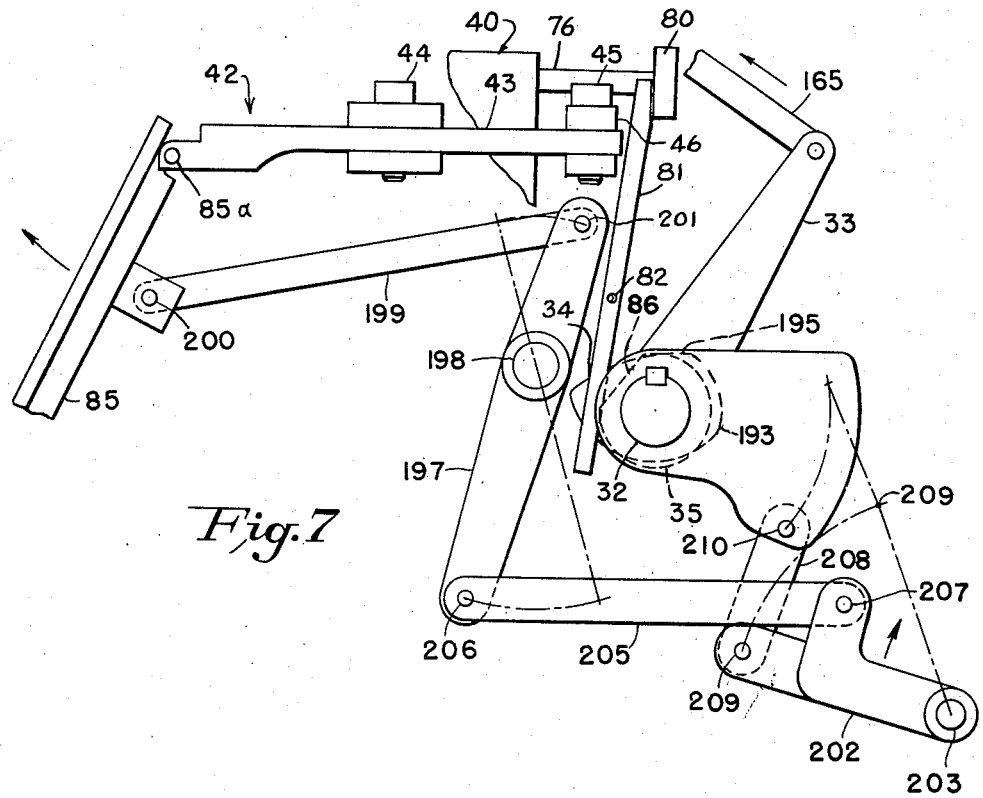
Figure 7 is an enlarged right end, elevational view of the control handle and its linkage, showing the inoperative position in full lines, the broken lines indicating the position assumed by certain of the links when in the operative position.
Figure 8:
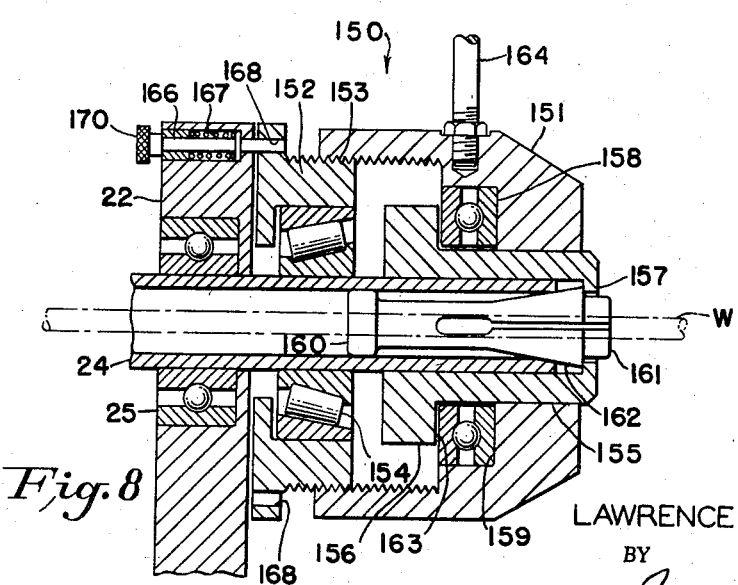
Figure 8 is a front, elevational, sectional view of the driving chuck shown in Figures 1 and 3, but on an enlarged scale.
Figure 11:
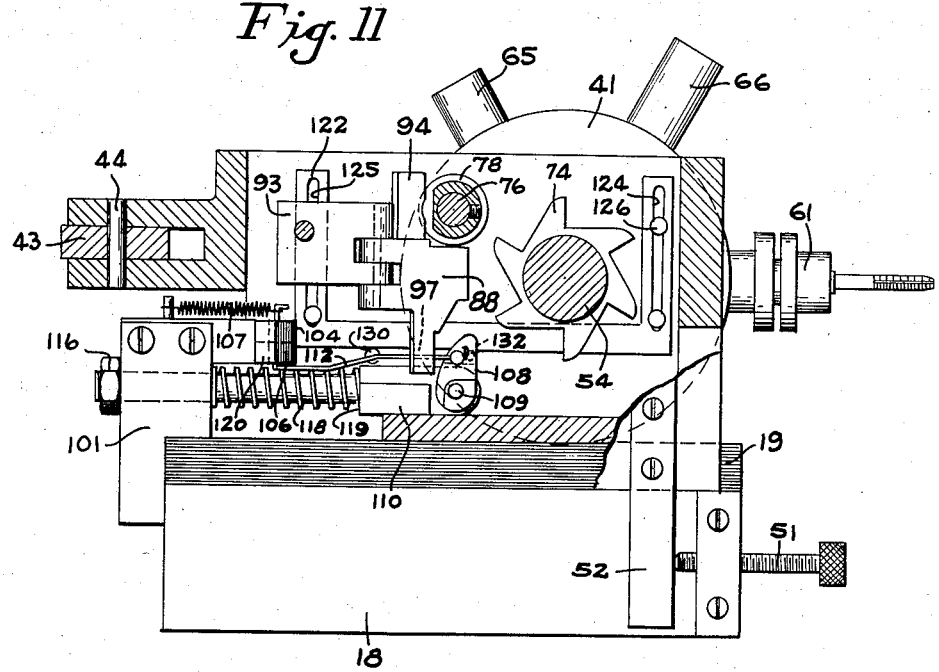
Figure 11 is an elevational view of the turret assembly and its mounting guide block, taken from the rear side of the machine, and showing certain parts in section and broken away for clarity.
Figure 12:
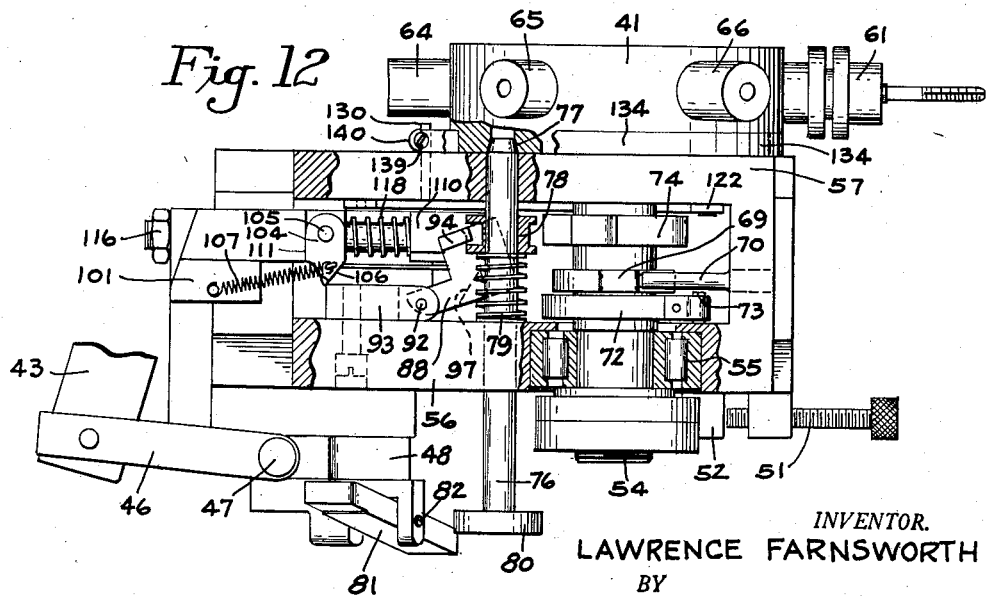
Figure 12 is a plan view of the device shown in Figure 11, certain parts in section and broken away for clarity.

Means are provided for rotatably holding the workpiece, which may be fed into the machine as stock of any length. A connection is provided for releasing the workpiece or for locking it in the driven position by movement of the control handle, such releasing or locking being synchronized with the operation of the turret. This connection is undisturbed to any appreciable degree even though various diameters of bar stock are to be worked. As shown in Figures 1, 3 and 8, this means includes a chuck 150 having a nose portion 151 and a rear index portion 152 threadably engaged therewith, as at 153. Rear portion 152 is rotatably mounted on the drive shaft 24 by the anti-friction tapered roller bearing assembly 154. A sleeve 155 is mounted on shaft 24 for slight axial movement relative thereto and has a thrust surface 163 formed by flange 156 at one end and an inwardly extending radial flange 157 at its other end. An axial thrust bearing assembly 158 is interposed between surface 163 and shoulder 159 of nose 151 so as to permit the nose portion to remain stationary while the sleeve 155 rotates with shaft 24. A conventional collet 160 is located in the end of shaft 24 and its jaws 161 are engaged by flange 157 to urge the inclined surfaces 162 against the end of the shaft, thus closing them together in clamping engagement with the workpiece. In other words, by screwing nose portion 151 further onto the index portion 152 the sleeve is drawn to the left, as viewed in Fig. 8, and the collet jaws caused to contract. Only a small amount of relative movement between portions 151 and 152 is required to cause the workpiece to be locked in the collet or released therefrom and this movement is accomplished through the upstanding manually operated means in the form of post 164 and the adjustable link 165 which it pivotally connected thereto and also to arm 33. Oscillation of the main shaft 32 to the position shown in full lines in Figure 7 causes the post 164 to move rearwardly thus opening the chuck and releasing the workpiece. This occurs when the handle portion 85 is dropped. When the handle 85 is raised the post 164 is rotated forwardly thereby clamping the workpiece in the collet for rotation with shaft 24. Various diameters of bar stock are used in a machine such as this and it is desirable to be able to quickly and easily insert these pieces in the chuck without disturbing the linkage connected thereto. For this purpose a pin 166 is slidably mounted in the upper portion of bearing block support 22 and is resiliently urged by spring 167 into engagement with any one of a plurality of apertures 168 circumferentially spaced around the index portion 152 thus locking it to support 22. By withdrawing the pin by its knurled end 170 from aperture 168, portion 152 can be rotated in either direction to cause the nose portion 151 to move axially thus varying the diametrical opening of the collet to accommodate various diameter pieces of stock. By this quick acting interengaging locking means between the chuck and support, the post 164 is always located on the top side of the chuck and small final adjustments of its connecting linkage can be made quickly by the turnbuckle 172 in link 165 which adjusts the length thereof.

Centering rest

The machine disclosed in this application finds particular utility in centering, drilling, chamfering and similar operations on small diameter workpieces, such as fractional horsepower electric motor shafts. The concentricity and depth limits of these cuts must be held within a few thousandths of an inch. To insure this accuracy, a centering rest 175 has been provided between the chuck 150 and the turret which is adjustably secured to the bed plates 16, 17 for movement therealong. The center rest acts to accurately and positively locate and hold the end of the piece being worked so as to insure the required degree of precision. The chuck holding device itself does not hold the piece accurately enough for precision work of this type and this is particularly true where bar stock of any length is rotated at high speeds. A certain amount of "whipping" of the workpiece is difficult to eliminate in conventional chuck driven machines. The center rest 175 comprises a stand 176 which is positioned transversely across the width of the bed plates 16, 17 and detachably secured thereto by an adjustable bolt means (not shown) extending downwardly from stand 176 and through the space 21 between plates 16, 17. A suitable nut means (not shown) may be threadably engaged on the bolt means beneath the plates to secure it in place. Such fastening means are conventional and will be apparent to those skilled in this art. Thus the steady rest may quickly and easily be slid along the bed and secured in position therealong. A pair of adjustable arms 178, 179 are swingably secured to stand 176 by the large bolt means 180. A set screw 181, 182 is provided for arm 178, 179 respectively, by which they are moved toward or away from each other for accommodating different diameter workpieces. The workpiece is adapted to lay on and between the anti-friction rollers 183, 184 on the arms for rotatable support thereon. After rollers 183, 184 have been positioned to accurately center the workpiece relative to the tool of the turret, they are locked in place by the bolt means 180. A locking arm 185 is pivotally mounted by the pin 186 on the stand 176 and has an adjustable part 187 which is also pivoted on pin 186. Arms 185, 187 may be adjusted relative to one another about pin 186 by the set screw 188 which extends freely through arm 185 and is threaded into arm part 187 and also by set screw 189 which is threadably engaged in arm 185 and its lower end bears against arm part 187. Arm part 187 carries on anti-friction roller 190 which is adapted to be swung downwardly about pin 186 until it firmly contacts the top of the workpiece, but permits it to rotate freely. When this roller is so positioned, the cam follower 192 on the other end of arm 185 is adapted to bear snugly against the diametrical portion 193 of cam 34 by suitable adjustment of set screws 188, 189. As seen in Figures 2 and 7, when the handle portion 85 is down, cam 34 has been rotated by its shaft 32 so the unlocking cam surface 195 is presented to cam follower 192 to permit the locking roller 190 to swing away from the workpiece. Thus an adjustable centering rest is provided for accurately locating and positively holding the rotatable workpiece, and which is operated by the same handle that operates the chuck and turret mechanism.

Actuating linkage

The linkage which connects the actuating portion 85 of the handle to the actuating shaft member 32 is perhaps shown best in Fig. 7. A link 197 is pivoted intermediate its length on pin 198 which extends from leg member 13. Another link 199 is pivoted to handle portion 85 at 200 and to link 197 at 201. An arm 202 is pivoted on pin 203 which is also secured to and extends from leg 13. A link 205 pivotally connects link 197 and arm 202 at 206 and 207 respectively. Still another link 208 pivotally connects arm 202 and linkage arm 36 at 209 and 210, respectively. As shown by the broken lines in Fig. 7, when the handle portion 85 is swung upwardly about its pivotal connection 85a the links 202 and 208 straighten out relative to one another and form an over-center linkage, their point of connection 209 going to or slightly over dead-center between pins 203 and 210.

Résumé

When the handle 85 is raised therefore, the shaft 32 is locked in position by the over-center linkage. This in turn locks the workpiece in the chuck, positions and locks the centering rest roller 190 on the workpiece and permits lever 81 to release the rod 76 so as to be in locking engagement with the turret.

With the workpiece accurately located and the turret indexed to the first tool (by previous dropping of handle portion 85) the operator then swings the entire handle 42 toward the workpiece about its pivot 45. When the first tool has completed its cut, which may only take a matter of seconds, the operator swings handle 42 and thus the turret away from the workpiece. The movement of turret and its associated trip 88 and toothed wheel 74 past the catch 104 and dog 108, respectively, causes the spring to be compressed, the turret unlocked and snapped into the next position and immediately locked again in this second position. The operator who has not had to remove his hand from the handle during these movements, then swings the handle and turret towards the workpiece for operation thereon by the second tool. This simple swinging of the handle 42 back and forth in a horizontal plane is done quickly and is repeated depending on the number of tools desired to be used. If the cut-off means 122—144 has been set at the second tool position, however, the second tool will remain in position for additional cuts because the index mechanism is rendered inoperative. When the handle 42 is swung away from the workpiece and the handle actuating portion 85 dropped, the turret will then be returned to the first tool or initial position by spring 72.

It will be noted that the turret is returned to its initial position without the necessity of it completing its full sequence or rotation. This is particularly desirable when only a few, say one or two tools are to be used, thus saving much time.

The dropping movement of the handle actuating portion 85 also unlocks the centering rest and the chuck for repositioning the workpiece bar stock for the next sequence of operations.

It should be understood that it is not intended to limit the invention to the above described forms and details, and that the invention includes such other forms and modifications as are embraced by the scope of the appended claims.

I claim:

1. A turret lathe including a support structure adapted to rotatably support a workpiece, a turret housing slidably mounted on said structure for movement toward and away from said workpiece, a turret assembly rotatably mounted on said housing adapted to carry a plurality of tools, said assembly also having a stop portion adapted to abut against said housing when one of said tools is in position to engage said workpiece; releasable lock means shiftably mounted on said housing for locking said assembly against rotation; index mechanism rigidly secured to said structure including a catch and a dog, a trip member mounted on said housing and adapted to release said lock means, whereby when said housing is slid away from said workpiece said catch will move said trip member to unlock said assembly and said dog will contact said assembly to index it in one direction, a manually operated handle mounted on said structure for sliding said housing, control means on said handle having a connection with said lock means for selectively releasing the latter, resilient means operatively connected between said assembly and said housing urging said assembly to rotate in a direction opposite to said indexing direction whereby when said lock means is released by said handle said resilient means will rotate the assembly in said opposite direction until said stop portion abuts against said housing to return said assembly for another cycle of indexing.

2. The combination set out in claim 1 including, cutout means mounted on said housing for shifting between index mechanism operative and inoperative positions, an adjustable stop secured to said turret and adapted to abut against said cut-out means when said turret rotates to a preselected position to thereby shift said cutout means and render said index mechanism inoperative.

3. A device as defined in claim 1 further characterized in that said catch and dog are connected together by a one-way sliding connection and are spring urged about their respective pivots to trip member and wheel contacting positions, respectively.

4. A device as defined in claim 2 further characterized in that said adjustable stop comprises a split ring adjustably secured to the periphery of said turret and having a yieldable stop thereon.

5. A device as defined in claim 1 including, an actuating shaft rotatably mounted on said support structure, said handle including a shaft actuating portion, linkage connected between said actuating portion and said shaft, said shaft having a turret release cam secured thereto, a lever pivoted to said support structure and engaged by said cam, said lever adapted to engage said lock means when said housing is slid away from said workpiece whereby said actuating portion can release said lock means by rotating said shaft.

6. A device as defined in claim 5 further characterized in that said actuating portion is pivotally connected to said handle about a generally horizontal axis whereby dropping movement of said portion rotates said shaft to the turret releasing position.

7. In a turret lathe having a support structure adapted to rotatably support a workpiece, a turret housing slidably mounted on said structure for movement toward and away from said workpiece; a turret assembly rotatably mounted on said housing including a turret adapted to carry a plurality of tools, an index member, and a stop member adapted to abut against said housing when one of said tools is in position to engage said workpiece; spring loaded releasable lock means shiftably mounted on said housing for locking said assembly against rotation; index mechanism comprising a catch and a dog each pivoted on said structure and within said housing, a trip member swingably mounted on said housing and adapted to release said lock means, whereby when said housing is slid away from said workpiece said catch will swing said trip member to unlock said assembly and said dog will contact said index member to index said assembly in one direction to a next tool position where said lock means again engages the assembly, a manually operated handle mounted on said structure for sliding said housing, control means on said handle having a connection with said lock means for selectively releasing the latter, spring means operatively connected between said assembly and said housing urging said assembly to rotate in a direction opposite to said indexing direction whereby when said lock means is released by said handle the assembly will rotate in said opposite direction until said stop means abuts against said housing to return said assembly for another cycle of indexing.

References Cited in the file of this patent

UNITED STATES PATENTS

| | | |
|---|---|---|
| 612,154 | Blood | Oct. 11, 1898 |
| 1,443,965 | Parsons | Feb. 6, 1923 |
| 2,689,739 | May | Sept. 21, 1954 |
| 2,704,672 | Wiltsie | Mar. 22, 1955 |